H. M. SCHEIBE.
MEANS FOR PRODUCING AIR CURRENTS.
APPLICATION FILED DEC. 19, 1913.
1,224,218.
Patented May 1, 1917.
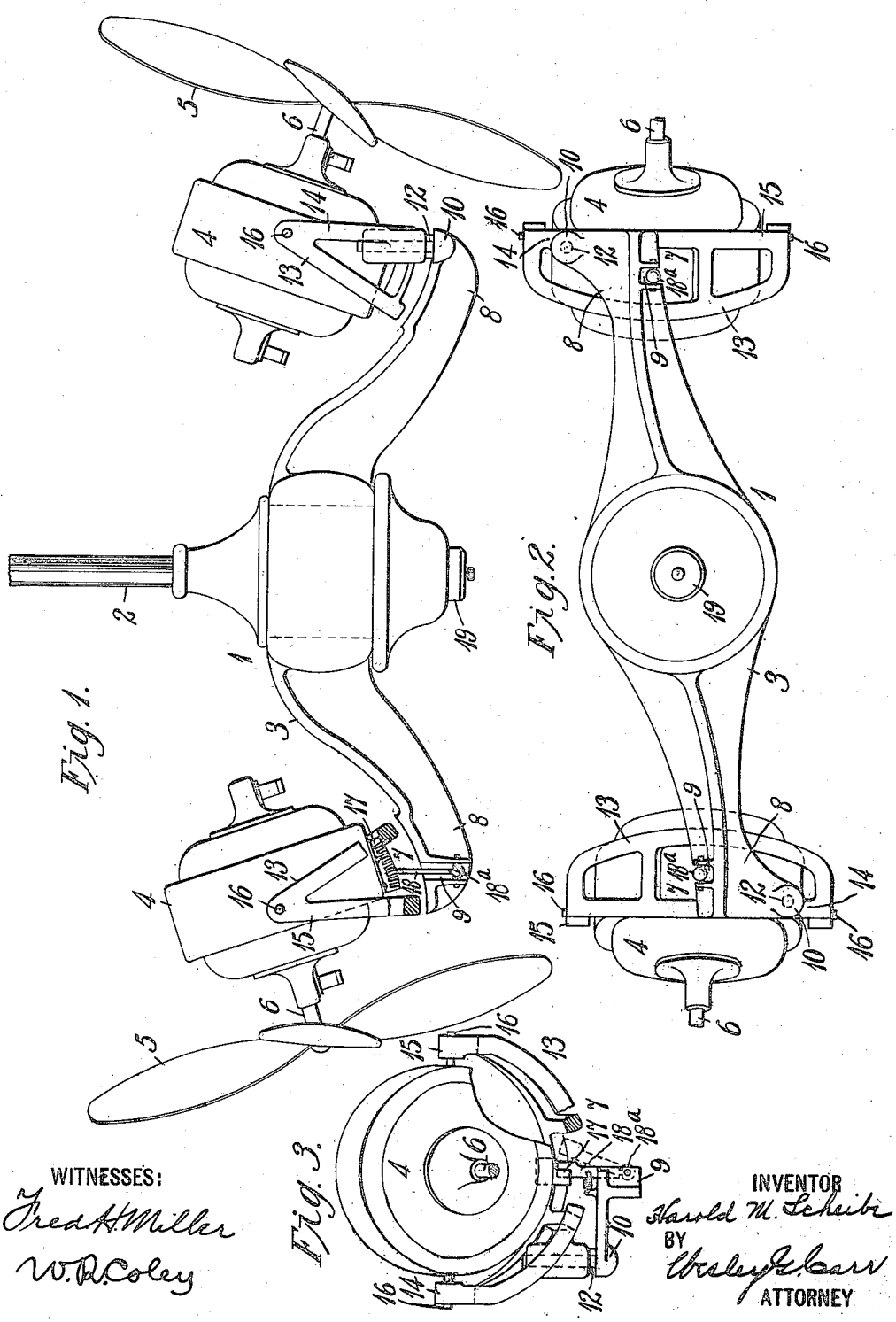

UNITED STATES PATENT OFFICE.

HAROLD M. SCHEIBE, OF CAMBRIDGE, MASSACHUSETTS, ASSIGNOR TO WESTINGHOUSE ELECTRIC AND MANUFACTURING COMPANY, A CORPORATION OF PENNSYLVANIA.

MEANS FOR PRODUCING AIR-CURRENTS.

1,224,218.    Specification of Letters Patent.    Patented May 1, 1917.

Application filed December 19, 1913. Serial No. 807,660.

*To all whom it may concern:*

Be it known that I, HAROLD M. SCHEIBE, a citizen of the United States, and a resident of Cambridge, in the county of Middlesex and State of Massachusetts, have invented a new and useful Improvement in Means for Producing Air-Currents, of which the following is a specification.

My invention relates to means for producing air currents and it has special reference to rotatable fans that are adapted to revolve automatically around an external axis.

One object of my invention is to provide a fan structure of the above indicated character which shall be provided with means for automatically maintaining, within desirable predetermined limits, a substantially constant velocity of revolution of the structure irrespective of the individual fan velocity of rotation and of the angle of tilt, without the aid of auxiliary braking devices or other similar apparatus.

Another object of my invention is to provide a rotatably mounted fan structure which shall be inexpensive, simple, and rugged in construction, reliable and effective in operation and neat in appearance.

Heretofore, in structures of the above indicated class, in order to compensate for the increase in fan thrust and consequent tendency of the structure to revolve more rapidly as the individual fan speed rises or as the angle of tilt is decreased, some form of brake or other frictional device has been used, particularly the centrifugal type, wherein the braking force is caused to vary with the speed. However, the installation and efficient maintenance of such brakes is expensive and their term of utility is limited.

According to my invention, I provide a rotatable fan structure from which braking devices of all forms have been eliminated. I obtain speed control of the structure by automatically adjusting the angular displacement of the motor shafts from a radial plane through the center of the structure support, this effect being accomplished by a readjustment of parts as the various forces present during operation establish a condition of equilibrium.

The substantially vertical swiveling of each motor about a suitably-disposed axis is controlled by two opposing sets of forces. The purposely unbalanced force of gravity on the motor body and the fan reactions tend to place each motor in the position of maximum turning moment for a given amount of thrust, as will be seen from the structure hereinafter described. Opposing the forces just mentioned, are the centrifugal force of revolution and the gyroscopic force of each fan, both of which forces increase with the velocity of revolution and thus may be utilized to turn each motor to a position of less rotative force on the fixture, thereby preventing a further change in the velocity thereof. By suitable design and proportion of the several parts embodied in my invention, I may, therefore, cause the fan structure to automatically assume a practically constant speed.

In a device of this character, it is desirable to vary the speed and the amount of tilting of the motors without affecting the speed of revolution of the structure.

The speed of rotation of the fan blades directly affects the gyroscopic torque, which is proportional to SIN—where S is the speed of fan rotation.
I is the moment of inertia of the rotating parts.
N is the speed of revolution of the structure.

It is possible to select a certain value for S which will make the fan reactions balance the effect of centrifugal force at the chosen value of N, in so far as turning each motor is concerned. With these values of S and N, it is obvious that the gravity torque and the gyroscopic torque on each motor must also balance, for a condition of stable operation. This balance, however, is disturbed when S increases unless N diminishes in like proportions, and, as hereinbefore noted, it is desired to keep N of constant value. Therefore, as S is increased, there must be a corresponding increase in the torque opposing gyroscopic action, that is to say, the gravity torque on each motor must be assisted at the higher speeds. This effect may be accomplished by proper design of the parts, thereby causing the increase in fan reactions to work with gravity in tending to turn each motor into a position of maximum driving effort.

The effect of tilting each motor is to reduce the horizontal component of its shaft thrust and to increase the horizontal component of the torque driving the blades. As both quantities are proportional to $S^2$ their proportion for any angle of tilt is not affected by the fan speed and, by using the proper radius arm for the thrust, the consequent torque may be combined with the horizontal blade torque to produce a substantially constant total, irrespective of the degree of motor tilting. By this means, tilting may be made to have a very small effect on the speed at which the structure revolves. Also, the gravity torque may be made almost independent of motor tilt by locating the trunnion pivots slightly above the center line of the motor.

In the accompanying drawing, Figure 1 is a view, in side elevation, with parts broken away, of a portion of an apparatus constructed in accordance with my invention, Fig. 2 is a bottom plan view, with parts omitted, of the apparatus shown in Fig. 1, and Fig. 3 is a view, with parts broken away, of a portion of the device shown in the other figures.

Referring to the drawing, a fan structure 1 comprises a vertically-disposed standard 2, a support or multiple bracket member 3 that is adapted to rotate on the standard, a plurality of motors 4 severally mounted near the ends of the brackets, a plurality of fans 5 attached to shafts 6 of the motors and a plurality of regulating devices 7 that are employed in connection therewith.

Since the form of the standard 2 and the means for rotatably mounting the bracket member 3 thereon are not material to my present invention, any suitable type may be employed. The bracket member 3 embodies a plurality of outwardly projecting arms 8, severally having reversely disposed near their outer ends preferably a recess 9 on one side and a projection 10 on the opposite side that has an opening extending therethrough for receiving a preferably vertically disposed supporting pivotal member 12. A plurality of trunnions 13 of substantially U-shape severally have one arm 14 pivotally or otherwise rotatably attached to the pivotal member 12. The motors 4 of any suitable type, are severally pivotally mounted between the arm 14 and the oppositely disposed arm 15, the pivotal line 16 being disposed a suitable distance preferably ahead of the center of gravity to unbalance the motor, for a purpose to be hereinafter specified. The motors 4 are severally mounted to normally have their axial center lines, when extended, pass on opposite sides, respectively, of the center line of the standard 2, which, it will be understood, is the center of revolution. Each pivotal member 12 is so located that the center line of the corresponding motor shaft normally passes between the member and the center of revolution. It will be noted that, by reason of the above-indicated arrangement, a rotative couple will be set up by the several fan-thrusts during operation. It is understood that the particular form of the motors 4 and fans 5 to which reference is herein made is not material to my invention.

The regulating devices 7 severally comprise a suitably notched or toothed rack 17 that is secured to the bottom of the respective motor 4 and a suitably spring-pressed stop or latch member 18 that is rotatably supported, preferably within the recess 9, by a suitable hinge or ball and socket joint 18ᵃ and is adapted to adjustably engage the toothed rack to restrain the motor in a predetermined tilted position.

The particular system of installing supply conductors and switching devices for the motors 4 is not material to my invention. A snap-switch 19 and collector rings (not shown) may be conveniently located in the lower end of the standard 2 or any other suitable means may be employed.

Assuming the fan structure 1 to be at rest, the relative position of the parts may be described as follows: The action of gravity tends to draw down the rear end of each motor 4 by reason of the pivotal support thereof being ahead of the center of gravity. A certain force is thereby exerted on the spring-pressed latch 18 by the rack 17 and the reaction causes the motor 4 to swing inwardly around the pivotal member 12 and thus take a position wherein the perpendicular distance from the center of revolution to the projected axial line of the motor is relatively large. As the said perpendicular distance constitutes the arm of the fan thrust which, during operation, is exerted along the said axial line, it will be seen that the motors, at starting, are in a position of relatively large turning moment.

Assuming that electrical energy is supplied to the motors 4 by actuating the switch 19, the operation of the fan structure 1 is as follows: The relatively large turning moment exerted on the bracket 3 by the motors 4 at starting causes the structure 1 to rapidly attain the normal speed of revolution on the standard 2. If, for any reason, the velocity of revolution momentarily exceeds the predetermined value, the centrifugal force of revolution acts on each motor 4 to swing the same outwardly around the corresponding pivotal member 12; likewise the gyroscopic force of the fans 5 acts against the force of gravity to tend to tilt the motors 4 forward, but the reaction of the latches 18 causes the motors 4 to swing outwardly and assist the centrifugal force. By this means, the axial lines of the motors 4 are severally brought nearer to the center of revolution, that is, the arm of the rotative couple acting on the bracket 3 is decreased, thereby causing the velocity of revolution to resume the normal value. It will be understood that the regulating forces act in a reversed manner in case of a tendency to decrease the velocity of revolution.

It will be understood that many modifications in the design and structure herein set forth as embodying my invention may be made within the spirit and scope thereof, and I desire that only such limitations shall be imposed as are indicated in the appended claims.

I claim as my invention—

1. The combination with a rotatable supporting member, of a rotatable fan biased at rest to a predetermined position upon said member and adapted to effect rotative movement thereof and means for employing the centrifugal force of revolution and the gyroscopic force of said fan as substantially the sole means for maintaining a predetermined velocity of revolution, irrespective of the velocity of rotation of the fan.

2. The combination with a rotatable supporting member, of a rotatable fan disposed thereon and adapted to impart a rotative movement to said member and means for employing the centrifugal force of revolution and the gyroscopic force of said fan to automatically vary the rotative force on said member and to thereby substantially maintain a predetermined velocity of revolution of the said supporting member.

3. The combination with a rotatable supporting member, of a rotatable fan disposed thereon and adapted to impart a rotative movement to said member and means for employing the centrifugal force of revolution and the gyroscopic force of said fan to automatically move the parts thereof into a position adapted to vary the arm of the rotative thrust on said member about the center of revolution.

4. The combination with a rotatable support, a rotatable fan and a device for rotating said fan disposed upon said support to impart a rotative movement thereto, of a member of substantially U-shape between the arms of which said device is pivotally supported upon an axis outside its center of gravity, and a pivotal mounting for said member associated with said support and normally located aside from the line from the center of rotation of the support through the center of gravity of said device.

5. The combination with a rotatable support, a rotatable fan and a device for rotating said fan disposed upon said support to impart a rotative movement thereto, of a trunnion between the arms of which said device is pivotally supported upon an axis outside its center of gravity, a pivotal mounting for said trunnion associated with said support and normally located so that the projected axis of rotation of said device will pass between the center of revolution of said support and said pivotal mounting and means for adjusting the position of said device in said trunnion.

6. The combination with a rotatable support having a plurality of arms, of a rotatable fan and a device for rotating said fan disposed on each of said arms, said fan being adapted to effect rotative movement of said support, a plurality of trunnions between the respective arms of which said devices are severally pivotally supported outside the respective centers of gravity, a plurality of pivotal mountings for said trunnions normally severally located on the same side of the center of rotation of said support as the projected axis of the corresponding device, a notched member secured to said device and means associated with said support for adjustably engaging said notched member to restrain said device.

7. The combination with a rotatable supporting member, of a plurality of rotatable fans disposed thereon to impart a rotative movement to said member, and means for converting the gyroscopic tilting torque of said fans into a turning torque substantially at right angles thereto during operation.

8. The combination with a rotatable support, a plurality of rotatable fans and devices for rotating said fans disposed upon said support to impart a rotative movement thereto, of a trunnion member within which each of said devices is pivotally supported, a pivotal mounting for said members, and means for converting the gyroscopic tilting torque of said devices within said members into a turning torque around said pivotal mounting, during operation.

9. The combination with a rotatable support, a rotatable fan and a device for rotating said fan disposed upon said support to impart a rotative movement thereto, of a trunnion between the arms of which said device is pivotally supported, an eccentrically disposed pivotal mounting for said trunnion, a notched member secured to said device and means movably associated with said support and adjustably engaging said notched member for converting the gyroscopic tilting of said device within said trunnion into a turning torque thereon around said pivotal mounting during operation.

10. The combination with a rotatable support, a rotatable fan and a motor for rotating said fan disposed upon said support to impart rotative movement thereto, of a trunnion between the arms of which said motor is pivotally supported outside its center of gravity, a pivotal mounting for said trunnion normally located on the same side of the center of rotation of said support as the projected axis of said motor, a notched member secured to said motor and means movably associated with said support for adjustably engaging said notched member to restrain said motor and for converting the gyroscopic tilting force of said motor within said trunnion into a turning force thereon around said pivotal mounting to act in conjunction with the centrifugal force of revolution of the motor to vary the rotative force on said support for maintaining a predetermined velocity of revolution during operation.

In testimony whereof, I have hereunto subscribed my name this first day of December, 1913.

HAROLD M. SCHEIBE.

Witnesses:
 GEO. H. OLSON,
 FRED F. FRANCIS.